Figure 1:
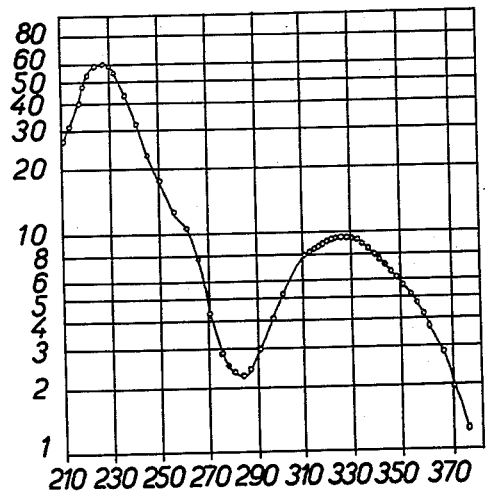

INVENTORS:
GÜNTER SCHMIDT-KASTNER, JOHANNES SCHMID, FERDINAND GREWE, VICTOR FLÜCK.

BY

ATTORNEY

3,107,202
ANTIBIOTIC PHYLLOMYCIN AND A PROCESS FOR THE PRODUCTION THEREOF

Günter Schmidt-Kastner and Johannes Schmid, Wuppertal-Elberfeld, Ferdinand Grewe, Cologne-Stammheim, and Victor Fluck, Leverkusen, Germany, assignors to Farbenfabriken Bayer Aktiengesellschaft, Leverkusen, Germany, a corporation of Germany
Filed July 10, 1958, Ser. No. 747,797
Claims priority, application Germany July 13, 1957
4 Claims. (Cl. 167—65)

The invention relates to a process for the manufacture of a new Streptomyces antibiotic having bacteriostatic and fungistatic properties. It is contained in the culture solution and in a small amount in the mycelium of a new Streptomyces and has been designated phyllomycin because of its activity against phytopathogenic fungi.

The Streptomyces isolated from river slime which was called *Streptomyces umbrosus* and registered under this designation with the Centralbureau voor Schimmelkultures Baarn, Holland, is not identical with any of the known Streptomycetes.

According to "Actinomycetes and Their Antibiotics" by S. A. Waksman and H. A. Lechevallier, 1953, page 66, it is similar to *Streptomyces viridoflavus* in that it is of a chromogenic type having a pigment soluble in all organic media, but differs from the latter in some essential features. According to the diagnostic methods of W. Lindenbein (Archiv f. Mikrobiologie 17, 361–381 (1952), the new species has the characteristics listed in the following Table 1.

early compared with other active substances and reaches its maximum after 3 days. Small amounts of phyllomycin may be produced in a shaking flask or in the surface culture. For the manufacture of large amounts of the antibiotic the stirred submerged aerobic culture is preferred. In order to achieve a growth as rapid as possible and thus a shorter fermentation period, the culture is always amply inoculated with a freshly prepared spore suspension or a corresponding submerged preliminary culture. *Streptomyces umbrosus* can be cultivated at temperatures of between 26 and 32° C., preferably at 29° C.

The manufacture of the active substances is, however, not limited to the use of *Streptomyces umbrosus*, but comprises also mutations of this strain which are obtainable by the action of mutation agents such as ultraviolet rays, X-rays and chemical substances.

The concentration of the antibiotic in culture filtrates and culture extracts is ascertained by means of *Rhodotorula flava* CBS–331 as a test organism. A typical culture filtrate still inhibits the growth in the hole-plate test on a nutrient medium suitable for yeasts at a dilution of 1:50.

The antibiotic is obtainable from the culture filtrates by extraction or adsorption. For the extraction ethyl acetate and butyl acetate are particularly suitable, but chlorinated hydrocarbons, ethers, ketones, and alcohols are also applicable. The extract of the culture liquor is concentrated by evaporation under vacuum, accompanying substances are precipitated with hydrocarbons and, after removal of the hydrocarbons under vacuum, the oily residue is treated

TABLE 1

Culture properties of Streptomyces umbrosus

| Medium | Growth | Colour of culture surface or aerial mycelia | Colour of lower side of culture | Pigment format and colour | Remarks |
|---|---|---|---|---|---|
| Synthetic agar | Finely crusty | Dull brownish yellow, no aeromycel | Brownish yellow | Brownish yellow | |
| Synthetic solution | Weak, only on bottom | White | | | |
| Glucose liquor | Very slight, only on bottom | Not detectable | | | |
| Glucose agar | Good | Aerial mycelia greyish black | Dull brownish | Yellow | |
| Glucose asparagine Agar | Good, thin | Aerial mycelia grey | Brownish | Brownish yellow | |
| Ca-malate agar | Thin, slimy | Dull brownish no aerial mycelia | Dull brownish | | |
| Gelatine | Good, velvety cushion-shaped | Aerial mycelia whitish yellow | Not detectable | Deep brown | No liquefaction |
| Starch agar | Not good, thin | No aerial mycelia brownish | do | Blackish brown | |
| Nutrient agar | do | No aerial mycelia greyish brown | Greyish brown | Brown | |
| Potato | Not good | No aerial mycelia, grey | | | Potato coloured deep dark. |
| Carrot | No growth | | | | No growth on cellulose strip. |
| Cellulose medium | Weak on bottom | White | | | |
| Litmus-milk agar | Good | No aerial mycelia, dull brownish | | | Litmus decoloured. |

*Streptomyces umbrosus* can be cultivated with formation of the active substance on nutrient solutions with, for example glycerol or malt extract as a carbon source, and peptone, corn steep liquor, brewer's yeast or casein hydrolysate as a nitrogen source, with the addition of inorganic salts such as sodium chloride, dipotassium hydrogen phosphate, ferrous sulphate and magnesium sulphate. The culture medium should moreover contain the main trace elements which are usually contained in the tap water and in natural additives for nutrient media such as brewer's yeast. The pH-value of the nutrient solution before inoculation should be between 6.5 and 7.5. It has been observed that in almost all culture experiments, the medium gradually becomes acid at the beginning. The formation of the antibiotic sets in very with a low molecular weight alcohol, preferably methanol. After separation of the methanol-insoluble portions and concentration, a brown oil (unsaponifiable part of the oil: 20 percent; iodine number 290) is obtained which in a dilution of 1:1,000,000 is still active against *Rhodotorula flava* in the hole-plate test. The following biological tests were carried out with this oily phyllomycin concentrate. For further purification of the fungistatic agent, the phyllomycin concentrate of the potency of 1:1,000,000 is distributed over 10 steps in counter-current with a system consisting of 13 parts by volume of ligroin, 6 parts by volume of butyl acetate, 2 parts by volume of di-n-butyl ether, 14 parts by volume of N-dimethyl formamide and 7 parts by volume of water, fraction five is distilled to dryness under vacuum, and from the solid residue phyllomycin is obtained after crystallisation from methyl propyl ketone as needles arranged in rosettes of M.P. 177–178.5° C. (uncorrected); $[\alpha]_D^{21} = +75°$ (c.=0.834% in chloroform); C: 57.70%, H: 5.77%, N: 5.88%, O: 30.74%, empirical formula $C_{23}H_{28}N_2O_9$; $\lambda$ max 322 m$\mu$ with $\alpha = 9.70$ and $\lambda$ max 225 m$\mu$ with $\alpha = 60$ ($\alpha$=specific extinction coefficient=extinction for c.=1 gram/litre and d.=1 cc.).

Phyllomycin possesses characteristic absorption bands in the infrared spectrum at the following wave lengths (KBr-pills), the values in parentheses give the percentage permeability: 2.97 (50.7%); 3.37 (54.8%); 5.72 (7.1%); 5.97 (27.7%); 6.10 (34.6%); 6.21 (37.0%); 6.29 (47.3%); 6.55 (17.1%); 6.87 (47.8%); 6.98 (48.4%); 7.36 (30.0%); 7.52 (43.2%); 7.64 (48.8%); 7.84 (36.3%); 7.98 (24.2%); 8.49 (17.0%); 8.66 (17.2%); 9.28 (36.9%); 9.30 (37.1%); 9.49 (49.0%); 9.85$\mu$ (44.6%).

Figure 2:
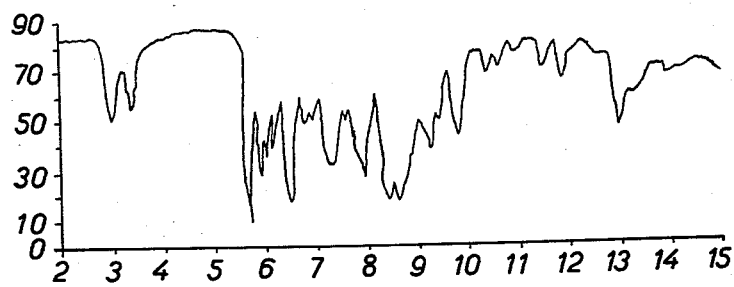

The exact course of the absorption curves in the ultraviolet and the infra red range of the spectrum can be seen from FIGS. 1 and 2.

Phyllomycin is stable to temperatures within certain limits; at 20° C. the tested activity on *Rhodotorula flava* is maintained for 7 hours, at 50° C. the activity under comparable test conditions is 100 percent after 3 hours, 95 percent after 7 hours; at 100° C. 100 percent after ½ hour, 80 percent after 3 hours, 18 percent after 7 hours; at 150° C. 3 percent after ½ hour, 0 percent after 3 hours. Phyllomycin is sensitive to alkali.

In the ring distribution chromatograph, the following $R_F$ values were found with the aforesaid distributing systems: 0.13 with 1 part by volume of water, 1 part by volume of ethylene glycol, 4 parts by volume of N-dimethyl formamide, 3 parts by volume of di-n-butyl ether, 3 parts by volume of ligroin; 0.31 with 1 part by volume of ethylene glycol, 2 parts by volume of N-dimethyl formamide, 1 part by volume of di-n-butyl ether, 2 parts by volume of ligroin; 0.68 with 1 part by volume of water, 2 parts by volume of methanol, 2 parts by volume of N-dimethyl formamide, 2 parts by volume of butyl acetate, 3 parts by volume of ligroin; and 0.88 with 1 part by volume of water, 3 parts by volume of ethylene glycol, 2 parts by volume of dimethyl formamide, 3 parts by volume of butyl acetate, 2 parts by volume of ligroin. For carrying out the chromatograph, circular filter papers (Schleicher and Schüll 2043b) were sprayed in each case with the hydrophilic phase of the distributing system previously put in the state of equilibrium by prolonged shaking, and developed with the hydrophobic phase. After drying of the chromatograph, an 0.5 millimetre-wide strip is radially cut out and placed on an agar plate seeded with *Rhodotorula flava*. At the point where the active substance is present, a clear inhibition zone is formed on incubation from which the $R_F$ value is calculated as the quotient of the running path of the antibiotic to the running path of the hydrophobic phase (=solvent front).

The crystalline phyllomycin still inhibits *Rhodotorula flava* CBS-331 in the hole-plate test at a dilution of 1:50,000,000 to 1:100,000,000.

On the other hand phyllomycin is obtainable from the culture medium by putting the centrifuged or filtered culture solution in contact with an adsorption agent, particularly active carbon, by separating the adsorbate and desorbing the active substance with organic solvents, especially chlorinated hydrocarbons and alcohol.

In addition to phyllomycin, the culture filtrates contain another antibiotic which is also effective against fungi, for example *Rhodotorula flava* and *Cladosporium cucumerinum*. When extracting it with organic solvents such as butyl acetate or ethyl acetate it remains in the aqueous phase.

Phyllomycin has a marked activity on phytopathogenic organisms in vivo and in vitro. For testing, a phyllomycin concentrate was used (activity against *Rhodotorula flava* 1:1,000,000) the activity of which in vitro against fungi and bacteria in the slant dilution test and in the hole-plate test is given in Table 2 and whose activity in vivo on plants is indicated in Table 3. However, the activity of the antibiotic is not limited to the organisms listed in Tables 2 and 4. Phyllomycin can be used for systemic plant protection. The infestation quotient of *Omphalia flavida* on coleus plants after impregnation of the soil with a 1 percent phyllomycin solution equals 52, and after impregnation with an 0.1 percent solution 68 (control 100) (see Table 3).

At a concentration of 1:1,000,000, phyllomycin possesses only a slight phytotoxicity (see Table 4). With an 0.1 percent solution, no damage was noticeable. The results obtained with a 1 percent solution are also negligible.

Figure 3:
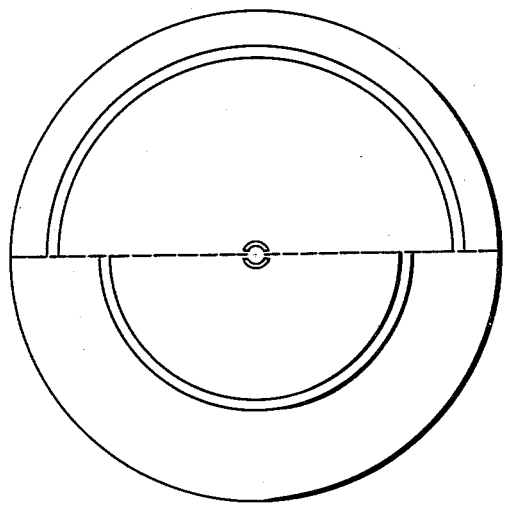

A group of compounds are known as fungistatic streptomycetes antibiotics such as fungicidin (=nystatin) (J. D. Putcher, G. Boyack, S. Fox, Antibiotics Annual, 1953–1954, page 191), eurocidine (Y. Okami, R. Wahara, S. Nakomura, H. Umezawa, Journal of Antibiotics, Japan, 7A, page 98, 1954), flavacide (J. Takahashi, Journal of Antibiotics, Japan, 6A, page 117, 1953), candicidine (H. A. Lechevalier, R. F. Acker, C. T. Corke, C. M. Haenseler, S. A. Waksman, Mycologia 45, page 155, 1953), which are chemically distinguished by a chain of conjugated double bonds and possess an absorption spectrum, typical for this constitution, with 3 maxima situated very closely to one another, for example fungicidin (=nystatin) at 292, 304, 318 m$\mu$, eurocidine at =318, 333 and 351 m$\mu$, flavacide at =341, 358 and 379 m$\mu$, and candicidine at 359.5, 379.5 and 491.5 m$\mu$. The new antibiotic phyllomycin has not such a typical absorption spectrum as can be seen from the annexed spectrum, and it should therefore be clearly distinct from the said compounds. Between actidione (A. D. Whiffen, R. L. Emmerson, N. Bohonos, U.S.P. 2,574,519; Upjohn Company), there also exists a clear distinction, since in the slant dilution test against *Cladasporium cucumerinum*, actidione inhibits the growth only at a dilution of 1:50,000, whilst phyllomycin is still active in 1:10,000,000. Clear differences are also noticeable in the biological activity between phyllomycin and the known antibiotic from streptomycetes, i.e. streptomycin, tetracyclin, viomycin, erythromycin, chloramphenicol and novobiocin. Thus, in the hole-plate test against *Candica utilis* CBS-840, the phyllomycin concentrate still gives an inhibition zone of 19 millimetres at a dilution of 1:200,000, whilst streptomycin is inactive at a dilution of 1:400, tetracycline at 1:400, viomycin at 1:400, erythromycin at 1:4000, chloramphenicol at 1:4000 and novobiocin at 1:6000. Differences also exist between phyllomycin and the antibiotic antimycin A found by C. Leben and G. W. Keitt (Phytopathology 37, 14 (1947), and 38, 899 (1948)). The "antimycin producing" Streptomyces NRRL 2288 shows already marked culture differences compared with the phyllomcycin-forming *Streptomyces umbrosus* as can be seen from Table 5. A direct comparison between an authentic antimycin A preparation and phyllomycin resulted in differences in the melting point (uncorrected): antimycin A; 136–137° C., phyllomycin; 177–178.5° C., mixed melting point 129–130° C.; and as can be seen from FIGURE 3, differences in the $R_F$ values in the ring distribution chromatograph when using a distributing system of 6 parts by volume of ligroin, 1 part by volume of di-n-butyl ether, 3 parts by volume of butyl acetate, 7 parts by volume of N-dimethylformamide, 3 parts by volume of water, and the technique described above (see FIG. 3). The chromatograph was developed with diazotised sulphanilic acid. Since qualitative and quantitative differences exist also with regard to the biological activity of the two fungistats (see Table 6), there can be no doubt that phyllomycin can be considered as a new antibiotic.

A pure culture of S. umbrosus has been filed with the United States Department of Agriculture, Agricultural Research Service, Northern Utilization Research and Development Division, Peoria, Illinois, under NRRL 2791.

TABLE 2

*Activity in Vitro of Phyllomycin-Concentrates*

Activity against *Rhodotorula flava* 1:1,000,000

| Kind of tests | Active marginal dilution | Test organism |
|---|---|---|
| R | 1:10,000,000 | *Cladosporium cucumerinum.* |
| R | 1:500,000 | *Cladosporium* sp. (Hopfen). |
| R | 1:500,000 | *Botrytis cinerea.* |
| R | 1:750,000 | *Xanthomonas malvacearum* Stamm R I. |
| R | 1:750,000 | *Xanthomonas malvacearum* Stamm R I. |
| Pl | 1:2,000 → 20 mm | } *Cerospora musae.* |
|    | 1:400 → 14 mm |   |
| Pl | 1:500 → 14 mm | } *Xanthomonas malvacearum* Stamm R I. |
|    | 1:1,000 → 8.5 mm |   |
| Pl | 1:500 → 11.5 mm | } *Xanthomonas malvacearum* Stamm R II. |
|    | 1:1,000 → 8.0 mm |   |
| Pl | 1:500 → 22.5 | } *Xanthomonas malvacearum* Stamm 1002. |
|    | 1:1,000 → 15.0 |   |
| Pl | 1:10,000 → 38 mm | *Sarcina lutea.* |
| Pl | 1:500,000 → 17mm | *Rhodtorula flava* CBS-331. |
| Pl | 1:200,000 → 19 mm | *Candida utilis* CBS-840. |
| Pl | Ineffective | *Staphylococcus aureus.* |

NOTE.—R=Slant dilution test. Pl=Hole-plate test.

TABLE 3

*Activity in vivo des phyllomycin-Concentrate*

[Activity aganist *Rhodotorula flava* 1:1,000,000]

| Concentration | Pest | Host | Infestation |
|---|---|---|---|
| 0.2% | *Phytophthora infestans* | Tomato plant | 52 |
| 0.1% | *Phytophthora infestans* | do | 59 |
| Untreated | *Phytophthora infestans* | do | 100 |
| 0.1% | *Alternaria solani* | do | 19 |
| 0.01% | *Alternaria solani* | do | 51 |
| Untreated | *Alternaria solani* | do | 100 |
| 0.05% | *Peronospora* | Vine | 20 |
| 0.01% | do | do | 37 |
| 0.005% | do | do | 40 |
| Untreated | do | do | 100 |
| 0.025% | *Pericularia crycae* | Rice plant | 66 |
| Untreated | *Pericularia cyecae* | do | 100 |
| 0.05% | *Omphalia flavida* | Coffee plant | 0 |
| 0.005% | *Omphalia flavida* | do | 1.2 |
| 0.0005% | *Omphalia flavida* | do | 78 |
| Untreated | *Omphalia flavida* | do | 100 |
| 1%[1] | *Omphalia flavida* | Coleus | 52 |
| 0.1%[1] | *Omphalia flavida* | do | 68 |
| Untreated | *Omphalia flavida* | do | 100 |

[1] The soil was soaked with the test solution (evaluation of the systemic activity).

TABLE 4

*Phytotoxicity of phyllomycin-Concentrate*

[Activity against *Rhodotorula flava* 1:1,000,000]

| Tested plant | Sprayed concentration percent | Result |
|---|---|---|
| Bean | 1 | Leaf edge necrosis; new growth normal. |
| Do | 0.1 | No damage; new growth normal. |
| Do | 0.05 | Do. |
| Do | 0.01 | Do. |
| Cotton | 1 | Leaf edge necrosis. |
| Do | 0.1 | No damage. |
| Coffee | 0.1 | Do. |
| Banana | 1 | Leaf spots on the basis of the centre leaf. |
| Do | 0.1 | No damage. |
| Rice | 0.1 | Do. |

TABLE 5

*Differentiation of "Antimycin producing" Streptomyces against Streptomyces umbrosus*

| | "Antimycin producing" Streptomyces NRRL 2288 | *Streptomyces umbrinus* |
|---|---|---|
| Colour of the aerialmycelia on glucose-asparagin-agar, glucose-agar and nutrient-agar | White to cream | Grey |
| Microscopic picture of aerial mycelia | No spirals | Spirals with 2–5 windings. |
| Colour of the substrate on peptonic nutrients (nutrient agar and gelatin agar) | No colour to slightly yellow. | Dark brown. |

TABLE 6

*Activity of Antimycin A and phyllomycin in the hole-plate test against three different Yeasts*

| Yeast | Antimycin A dilution ($-\phi$ mm. inhibition) | Phyllomycin dilution ($-\phi$ mm. inhibition) |
|---|---|---|
| *Candida lipolytica* (Harrison) Diddens et Lodder. | 1:10,000 → 21.8<br>1:40,000 → 20.5<br>1:160,000 → 18.0 | 1:640,000 → 27.0<br>1–2,500,000 → 20.0<br>1:10,000,000 → 12.5 |
| *Sporobolomyces holsaticus* Windisch. | 1:10,000 → 22.2<br>1:40,000 → 21.0<br>1:160,000 → 18.0 | 1:640,000 → 25.5<br>1:2,500,000 → 19.5<br>1:10,000,000 → 15.0 |
| *Rhodotorula glutiuis* (Fres.) Harrison. | 1:10,000 → 21.8<br>1:40,000 → 20.6<br>1:160,000 → 18.0 | 1:160,000 → 29.0<br>1:640,000 → 21.0<br>1:2,500,000 → 14.0 |

EXAMPLE 1

The following Examples are given for the purpose of illustrating the invention.

Into a 1-litre Erlenmeyer flask there are emptied 150 millilitres of a nutrient solution of the composition 2 percent of glycerol
0.1 percent of peptone
0.25 percent of glycocoll
0.1 percent of NaCl
0.1 percent of $K_2HPO_4$
0.02 percent of $FeSO_4 \cdot 7H_2O$
0.02 percent of $MgSO_4 \cdot 7H_2O$ the solution is sterilized at 120° C. for 20 minutes, cooled, inoculated with a spore suspension of *Stretomyces umbrosus* nov. spec. grown on a nutrient medium of the same composition with 2 percent of agar, and fermented at 29° C. in a shaking machine of 240 r.p.m. After a culture period of 72 hours, the fermentation liquor inhibits *Rhodotorula flava* at a dilution of 1:50. A 1000-litre fermenter is charged with 700 litres of a nutrient solution as follows 2 percent of glycerol
1 percent of dry brewer's yeast
0.25 percent of glycocoll
0.1 percent of NaCl
0.1 percent of $K_2HPO_4$
0.02 percent of $FeSO_4 \cdot 7H_2O$
0.02 percent of $MgSO_4 \cdot 7H_2O$
0.1 percent of silicone oil (commercial)

and sterilised on two consecutive days at 120° C. for 20 minutes each time. It is then inoculated with 2 litres of the above growing preliminary culture and vigorously stirred for 72 hours while air is passed through at a rate of 350 litres per minute. The activity against *Rhodotorula flava* then amounts to 1:50. The fermentation liquor is then freed from the mycelium on a centrifuge, the clear centrifugate extracted once with 300 litres of butylacetate, the yellowish green extract concentrated under vacuum to 4 litres at 50° C., treated with 16 litres of ligroin, a greenish brown precipitate is separated off and the solvents are distilled off under vacuum at 50° C. The remaining viscous residue which still contains the silicone oil added as an anti-frothing agent, is extracted twice with 3-litre-portions of methanol, the separated oily phase is removed and the methanol is distilled off under vacuum. 30 grams of a brown oil are obtained which inhibit the growth of Rhodotorula flava at a dilution of 1:1,000,000 and is used as a starting material for plant tests.

For further purification of the antibiotic, eight 10-litre separating funnels are charged with 4 litres each time of the organic phase of the distributing system: 13 parts by volume of ligroin, 6 parts by volume of butyl-acetate, 2 parts by volume of di-n-butyl ether, 14 parts by volume of N-dimethyl formamide and 7 parts by volume of water; 400 grams of the aforesaid phyllomycin concentrate having an activity of 1:1,000,000 are dissolved in 4 litres of the aqueous phase of the said distribution system and shaken for a prolonged time with 4 litres of the organic phase of the first separating funnel. The aqueous phase is separated off, added to the organic phase of the second separating funnel, and the first funnel is replenished with 4 litres of fresh aqueous phase. Both separating funnels are shaken for an extended time. This process is repeated in the counter-current distribution in 8 steps. All eight aqueous phases are discharged, 2 litres of ethyl acetate are added to the organic phases which are shaken once with water (the water is discarded). The eight aqueous phases are added to the corresponding organic phases, all eight fractions are shaken and the aqueous phases are separated off. The latter still contain small amounts of phyllomycin. The resulting organic phases are shaken thrice with 2 litres of water each time (water discarded) and distilled to dryness, under vacuum at a bath temperature of 60° C. Fractions four, five and six contain the bulk of the active substance. Fraction five yields, after re-crystallising three times from methyl-propylketone, 2 grams of phyllomycin as rosette-shaped needles, M.P. 177–178.5° C. (uncorrected), $[\alpha]_D^{21} = +75°$ (c.=0.834% in chloroform); 57.70% C, 5.77% H, 5.79% N and 30.74% O, $\lambda$ max 332 m$\mu$ with $\alpha$=9.70 and $\lambda$ max 225 m$\mu$ with $\alpha$=60, which at a dilution of 1:50,000,000 to 1:100,000,000 still inhibits the growth of Rhodotorula flava.

EXAMPLE 2

10 litres of culture solution of Streptomyces umbrosus nov. spec. with an activity against Rhodotorula flava of 1:50 are centrifuged, the clear centrifugate is stirred with 50 grams of active carbon and the carbon is centrifuged off. The culture solution freed from the adsorption agent, shows about 10 percent of the activity. The adsorbate is dried and stirred with 1 litre of chloroform at 50° C. for 30 mintues, centrifuged again and the supernatant chloroform solution is distilled to dryness. 1.7 grams of an oil remain as a residue which still inhibits the growth of Rhodotorula flava at a dilution of 1:200,000 and may be further purified, if desired, as described above.

We claim:
1. A process for the production of phyllomycin comprising the aerobic cultivation of a culture medium inoculated with a phyllomycin-producing strain of Streptomyces umbrosus nov. sp. for about 36–120 hours at a temperature of about 26–32° C., separating the culture broth from unwanted insoluble material including organism growth, extracting the crude phyllomycin with organic solvents, and recovering the crude phyllomycin therefrom.

2. A process for the production of phyllomycin which comprises the submerged aerobic cultivation of a peptone culture medium inoculated with a phyllomycin-producing strain of Streptomyces umbrosus nov. sp. for about 3–4 days at a temperature of about 26–32° C., separating the culture broth from unwanted insoluble material including organism growth, extracting the crude phyllomycin with organic solvents, and recovering the crude phyllomycin therefrom.

3. A process for the production of phyllomycin which comprises the submerged aerobic cultivation of a dried brewer's yeast culture medium inoculated with a phyllomycin-producing strain of Streptomyces umbrosus nov. sp. for about 3–4 days at a temperature of about 26–32° C., separating the culture broth from unwanted insoluble material including organism growth, extracting the crude phyllomycin with organic solvents, and recovering the crude phyllomycin therefrom.

4. Phyllomycin prepared by cultivating under aerobic conditions and at a temperature of about 26° to 32° C. a phyllomycin-producing strain of Streptomyces umbrosus nov. sp. in a nutrient medium, and thereafter separating the phyllomycin from the nutrient medium.

References Cited in the file of this patent

UNITED STATES PATENTS

| | | |
|---|---|---|
| 2,317,286 | Stillman et al. | Apr. 20, 1943 |
| 2,416,236 | Martin et al. | Feb. 18, 1947 |
| 2,483,892 | Ehrlich et al. | Oct. 4, 1949 |
| 2,617,755 | Benedict et al. | Nov. 11, 1952 |

OTHER REFERENCES

Erickson: Annual Review of Microbiology, vol. 3, 1949, p. 50.

Spector: Handbook of Toxicology, vol. II, Antibiotics, page 35, pub. 1957.

Waksman: Bacteriological Reviews, March 1957, pp. 1–29, (p. 5, column 1, first complete paragraph especially pertinent).

Watanabe et al.: J. Antibiotics, March 1957, vol. X, No. 2, Ser. A, pp. 39–45.

Pridham et al.: Applied Microbiology, January 1958, pp. 52–79.

Yonehara et al.: J. Antibiotics, Ser. A, May 1958, pp. 122–124.